UNITED STATES PATENT OFFICE.

JOHN JAMES HOOD AND ALFRED GORDON SALAMON, OF LONDON, ENGLAND, ASSIGNORS TO THE OIL REFINING IMPROVEMENTS COMPANY, LIMITED, OF GLASGOW, SCOTLAND.

TREATMENT OF MINERAL AND VEGETABLE OILS.

1,151,523.
Specification of Letters Patent. Patented Aug. 24, 1915.

No Drawing. Original application filed July 26, 1909, Serial No. 509,591. Divided and this application filed May 12, 1910. Serial No. 560,916.

*To all whom it may concern:*

Be it known that we, JOHN JAMES HOOD and ALFRED GORDON SALAMON, subjects of the King of Great Britain, both residing at 1 Fenchurch avenue, London, England, have invented new and useful Improvements in the Treatment of Mineral and Vegetable Oils, of which the following is a specification.

The object of the invention is to efficiently decolorize, and in some cases deoderize, for commercial purposes, crude oil whether mineral oil or vegetable oil, such for instance as cotton seed oil and wood oil, or the fractionated products thereof. This is effected by filtering the crude or fractionated oil through a material prepared by igniting magnesite ($MgCO_3$) to a dull red heat.

The mineral should be ground or pulverized to a condition which tests show to be the most suitable for the particular oil to be operated on and then sufficiently heated at a dull red heat. Such heating should always be of such duration as to render the material substantially anhydrous. It has been found by experiment that the greater the degree of fineness to which the magnesite is ground the better the result obtained. It is preferable to heat the magnesite to dull redness previous to grinding.

In order to obtain the maximum of efficiency of the filtering material it is desirable to protect it as far as possible from atmospheric influence after heating until such time as it is brought into contact with the oil.

The efficiency of the magnesite for the aforesaid purpose varies very greatly with its physical condition as well as its purity and consequently in order to secure success it is necessary to proceed by way of selection, and this can best be effected by making preliminary experiments upon a small laboratory scale. As a guide to the selection of the magnesite we may say that it should be as free as possible after ignition from lime iron and silica.

The amount of oil that can be passed through a given weight and volume of the filtering material will vary with the commercial requirements in respect of the color of the oil but it is found that satisfactory results can be obtained by using a series of two or more filtering vessels, and ultimately using the last or catch vessel as the first vessel of the series, but we do not restrict ourselves to this method of employing the material. We have used a depth of filtering material of four feet in a vessel one foot in diameter. When the material is no longer satisfactory it can generally be again fitted for use by distilling off the absorbed oil, driving it out with steam or washing it out with light petroleum ether according to circumstances and then igniting for a suitable time at a dull red heat.

In treating thick dark viscid oils, such as the fractions intended for lubricating purposes or crude cotton seed oil, we proceed as follows: The viscid oil is dissolved in a suitable volume of light petroleum spirit, such volume being determined for each particular dark oil experimentally, and the solution is passed through the filtering medium. The proportion of light petroleum spirit to oil may be three volumes of light petroleum spirit to one volume of oil but this may be increased up to say ten volumes of spirit if it be commercially possible as regards cost. The filtering medium is then washed with such spirit, and the resulting filtrate and washings distilled; such distillation may be carried on continuously, the filtrate being run in a continuous stream from the filters to the still. The light spirit so used is collected and may be used again for similar purposes.

It is found that generally the lower the boiling point of the spirit the greater its efficiency, and also that generally a light spirit which reacts to any marked extent when treated with bromin is not so efficient as one that will not readily react with bromin. Without attempting to describe the theory underlying these observations we desire to point out that as the result of experiments a considerable variation is found in the efficiency of available light spirits and therefore it is necessary to make a preliminary test of the light spirit by mixing it with the oil to be treated and passing the mixture through the filtering material. The selection of the light spirit for efficient use should depend upon the results thus obtained.

The application for this patent is a division of our application for Patent No. 509,591, filed July 26, 1909 (Patent No 962,840 of June 28, 1910) in which we claim a process of decolorizing oil which consists in filtering it through magnesia prepared by first precipitating magnesium hydrate and then rendering the magnesia anhydrous.

What we claim is:

1. The process herein described of decolorizing oil which consists in filtering it until the color is removed through material prepared by igniting magnesite to a dull red heat to render it anhydrous.

2. The process herein described of decolorizing oil, which consists in dissolving it in light petroleum spirit, filtering the solution until the color is removed through material prepared by igniting magnesite to a dull red heat to render it anhydrous and distilling the filtrate.

3. The process herein described of decolorizing oil, which consists in filtering it until the color is removed through material prepared by pulverizing magnesite and igniting it to a dull red heat to render it anhydrous and protecting it from atmospheric influence until brought into contact with the oil to be decolorized.

JOHN JAMES HOOD.
ALFRED GORDON SALAMON.

Witnesses:
H. J. Lewis,
William de Vere Mathew.